April 21, 1925.  1,534,307
F. DE PALMA
SHAVING CREAM DISPENSER
Filed June 3, 1921
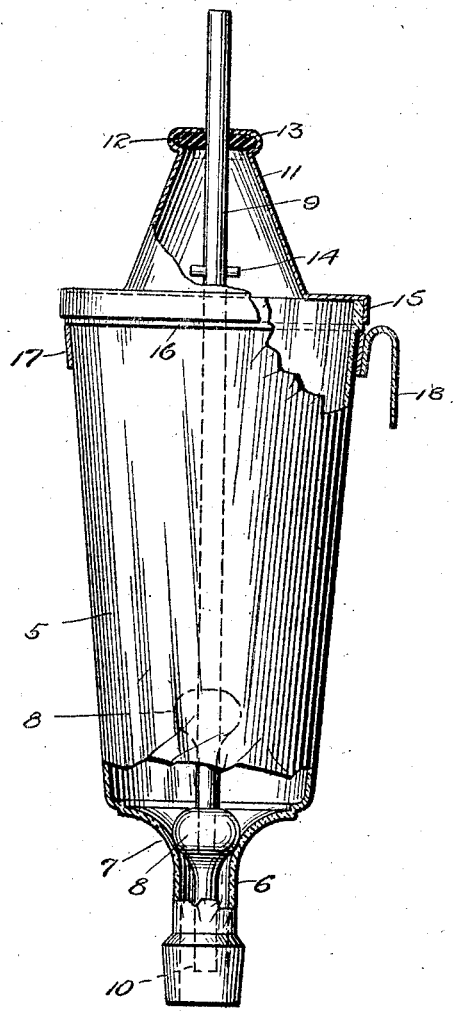
INVENTOR
Frank De Palma
BY
ATTORNEY
WITNESS
M. E. Lessin Patented Apr. 21, 1925.

1,534,307

UNITED STATES PATENT OFFICE.

FRANK DE PALMA, OF BROOKLYN, NEW YORK.

SHAVING-CREAM DISPENSER.

Application filed June 3, 1921. Serial No. 474,589.

*To all whom it may concern:*

Be it known that I, FRANK DE PALMA, a citizen of the United States, and a resident of the city of New York, borough of Brooklyn, county of Kings, and State of New York, have invented certain new and useful Improvements in Shaving-Cream Dispensers, of which the following is a full, clear, and exact description.

Among the principal objects which the present invention has in view are: to avoid evaporation of the liquid element of shaving creams; to dispense the same readily and in desired quantities; to permit visual observation of the contents of the dispenser; and to cheapen and simplify the construction.

The drawing is a side view of a dispenser constructed and arranged in accordance with the present invention, a portion thereof being cut away and shown in section to illustrate the structural features thereof.

Description.

In the drawing the numeral 5 is employed to indicate a container. The container is preferably constructed of transparent glass, and is slightly tapered downwardly to and in a delivery spout or neck 6. The neck 6 is connected to the main body of the container 5 by a rounded portion 7, which provides a seat for the ball valve 8 at the end of the plunger 9.

The plunger 9 is provided with a nipple extension 10, at the lower end thereof, which extends through the openings in the neck 6. The upper end of the plunger is passed through an opening in a funnel-like cover 11, and in the rubber gasket 12 therefor. The gasket 12 is held permanently in position by the annular recess 13. The gasket 12 has a perforation therein slightly smaller than the diameter of the plunger 9, to form a frictional or rubbing connection therewith, to clear the said plunger of any adhering cream or liquid when the said plunger is lifted above the cover 11. The lift of the plunger 9 is limited by a pin 14 which extends through the said plunger to engage the gasket 12 to be arrested thereby when the said plunger is elevated. The cover 11 has an annular flange 15, which fits the bead 16 on the container 5 to form a close joint therewith.

In practice the container 5 is held suspended from the structure by means of the metal ring 17 and the hook 18 rigidly or integrally connected with the said ring. Preferably the ring 17 fits the container 5 sufficiently closely to be held in service relation therewith.

To use the dispenser the first operation is to fill the same to accomplish which the cover 11 is removed. If necessary, the cover 11 is separated from the plunger 9. This action is not as a rule found to be necessary. The cover 11 and possibly the plunger 9 being removed, the interior of the container 5 is filled with the cream mentioned. The cover and plunger 9 are then replaced, and the plunger is forced downward through the contents of the container, until the valve 8 rests firmly on its seat. This prevents the weight of the body of the cream in the container forcing through the neck 6. After the cover 11 has been adjusted, the plunger 9 is reciprocated vertically, using the valve 8 to assist in forcing a succession of charges through the neck 6, until the desired quantity of the cream has been extracted from the container. When this has been accomplished, the plunger is allowed to rest with the valve 8 seated tightly on the rounded portion 7 of the container, thereby closing the container to the air, and also preserving the humidity of the contents of the container.

Claim.

A dispenser for unctuous cosmetics, comprising a container having a depending and restricted neck and an open upper end, a centrally perforated frusto-conical cover for said container, a stem vertically reciprocative in said container and extending through the cover perforation, a yieldable packing member carried by said cover around said stem, means on said stem adapted to engage said packing member to limit upward movement of the stem, a valve on said stem inwardly of the lower end thereof to seat on the inner end of said neck, and a plunger in said neck below the valve, said plunger comprising the lower end of said stem.

FRANK DE PALMA.